3,518,204
Patented June 30, 1970

3,518,204
CONTROL OF THE RATE OF PRECIPITATE GROWTH AND OF PRECIPITATION IN AQUEOUS SYSTEMS
Gerald D. Hansen, Jr., Holicong, and Elizabeth A. Guthrie, Philadelphia, Pa., assignors to Betz Laboratories, Inc., Trevose, Pa., a corporation of Pennsylvania
No Drawing. Continuation-in-part of application Ser. No. 591,719, Nov. 3, 1966. This application Nov. 1, 1967, Ser. No. 679,619
Int. Cl. B01d 15/00; C02b 1/14, 5/06
U.S. Cl. 252—181                                   8 Claims

ABSTRACT OF THE DISCLOSURE

The present invention concerns methods and compositions for controlling the precipitation of undesirable and harmful precipitates from aqueous systems. Such control is achieved and exerted in respect to both the time and area at which such precipitation occurs, and in respect to the nature of the precipitate which is obtained. The control is accomplished by means of introducing within the aqueous system to be treated, a rate controlling agent which is competitive with the precipitate forming ingredients of the system in respect to their ability to react or associate within one another and thereby form a precipitate. However, the reactivity of the precipitate forming ingredients is preferential in relation to the rate controlling agent and the latter therefore merely impairs or inhibits the rate at which precipitate particles are formed and precipitated. The materials which provide the rate controlling function are those acids having a dissociation constant of between 3 to 8, such as triglycollamic acid.

---

The present application is a continuation-in-part of copending application Ser. No. 591,719, filed on Nov. 3, 1966.

The above copending application concerns the control of the rate of particle growth and precipitation in boiler water. In such applications, the precipitation of calicum and magneesium impurities in the boiler water is intentionally reduced by means of the addition of precipitating agents or precipitants which react with these impurties and thereby bring about their precipitation. In such applications, an adsorbent is conventionally employed to adsorb with the precipitate and render it manageable. In the latter regard, the adsorbent functions in reducing the adhesion of the precipitate to the boiler surfaces, retarding crystalline growth, and rendering the precipitate more manageable and susceptible to removal by means of the blowing down of the boiler. In the applicants' co-pending application, the function of the adsorbent is rendered more efficient by means of rate control. Rate control in that application comprises the superimposition of acids having a dissociation constant of between 3 to 8, upon the precipitating agent adsorbent system. Such acids, like the precipitating agents, have a potential for reaction or association, e.g. coordinating or complexing, with the impurities. However, such potential on the part of the rate control agents is inferior to the potential of the precipitating agents and the latter prevail to react with the impurities and form a precipitate. However, the rate of reaction of the precipitating agents with the impurities is retarded as the result of the unsuccessful competition of the rate control agent for reaction or association with the impurities. The latter serves to inhibit and thereby reduce the rate of the reaction between the precipitating agent and the impurities. As a consequence, the smaller particles of precipitate which result, present a greater total surface area which improves the extent of their adsorption with the adsorbent since adsorption is a surface function. Simultaneously, the reduced rate of reaction or association also reduces the rate at which the reaction or association products are precipitated from the system and thereby provides the adsorbent with a greater opportunity to adsorb with the precipitate. Accordingly, the more highly adsorbed precipitates are more manageable as the result of the reduction of their adhesion and the consequently increased ease of removal, while their crystalline growth is impaired by virtue of the interpositioning of adsorbent particles between and among the particles of precipitate, Whereas the copending application is limited to the treatment of boiler water, and to systems in which precipitation is positively induced by means of the addition of a precipitating agent to the system, the applicants have subsequently found that rate control is applicable and highly beneficial in various other applications. Specifically, the applicants have found that rate control may be successfully employed in systems wherein precipitation is a natural or non-induced occurrence. Furthermore, they have found that rate control may be employed to control the site and time at which precipitation occurs. It is these discoveries which constitute the subject matter of the present invention.

Natural or non-induced precipitation is a common and highly troublesome occurrence in a variety of systems. For example, water supplies employed as cooling media for steel mill, petrochemical, petroleum refining and other processes, frequently contain silts such as bentonitic or kaolinitic minerals. During the use of such silt containing waters in these systems, the silts react or associate with other impurities which are present in the water such as the calcium and magnesium components which are commonly referred to as 'hardness." As the consequence of such reaction or association, a precipitate is formed and precipitated upon the surfaces of the system containing the water. Such depositions may build up to the extent that flow through the system is reduced or halted, and the system must be shut down for costly cleaning. In addition, when such deposition occurs on heat transfer surfaces, heat exchange is reduced with a corresponding loss in process efficiency.

Other natural or non-induced precipitations occur in paper and pulp mill systems such as evaporators, digestors, concentrators and bleach systems. For example, oxalate and carbonate scale formation is frequently experienced in these environments. Oxalate scale results from the reaction of oxalic acid formed by the oxidation of hemi celluloses in the digestor and bleach phases, with natural water impurities such as calcium and magnesium. Carbonate scales are formed by similar reactions with materials resulting from causticization reactions in the processing of black liquors.

Other systems experiencing similar problems are the back-wash waters of evaporators in which carbonate and sulfate scales are formed from the magnesium, manganese, iron and cobalt impurities which are present in the system.

In all of the foregoing applications, adsorbents may be employed to control the form in which the precipitate is precipitated and to reduce the formation of scale. The applicants have found that rate control may be utilized to improve the efficiency of the adsorbent, and to control the time and site at which precipitation occurs.

It is an object of the invention to provide methods and materials whereby the adsorption of undesirable precipitates, and their consequent conversion to a more desirable and more manageable form, is improved.

A further object is the provision of methods and materials for preventing the formation of scale within systems containing impurities which are capable of reacting to form a reaction product which is prone to precipitation, deposition and crystalline growth.

Another object is the provision of methods and materials for the prevention of the precipitation and deposition of silt from waters containing silt.

As previously discussed, the rate controlling agents function by competing with, and thereby inhibiting, the reaction of those constituents of the aqueous systems which react to form precipitates. It should be noted that while the rate controlling agents possess the ability to react or associate with one or more of the potential scale forming ingredients of the aqueous system, this ability is inferior to the ability of the scale forming ingredients to react with one another. As a consequence, the reaction of the scale forming ingredients does go to completion. However, the reaction rate of the scale forming ingredients is greatly reduced by the inhibiting effect of the rate control agents in their attempt to also react or associate with the scale forming ingredients. As a result of the reduced rate of reaction, and the consequent reduction of the rate of particle growth of the precipitate and of the rate at which precipitation occurs, the efficiency of the adsorbent is greatly enhanced. In the first instance, the smaller particle size of the precipitate, which results from the reduced rate of the reaction in which the precipitate is formed, provides a condition of maximum surface area which increases adsorption since the latter is a surface phenomenon. Secondly, since the rate of precipitation is also reduced, the adsorbent is provided with a longer period, and greater opportunity, to adsorb with the precipitate. Accordingly, two separate benefits in respect to scale control are provided. In the first instance, the rate of precipitation is slowed to the extent that actual precipitation and deposition may in fact occur outside of the area in which precipitation is undesirable. Secondly, even if precipitation does occur in areas in which it is undesirable, the nature of the deposited precipitate is so drastically changed as to eliminate or greatly reduce the problems which are normally caused by such precipitation. In the latter regard, the adsorbed precipitate has a reduced tendency to adhere to the surfaces of the system and is removed by normal flow conditions within the system. Secondly, the physical presence of adsorbent interspersed with the precipitate particles, impedes the occurrence of harmful crystalline growth in the event that the adsorbed precipitate does adhere to the surfaces of the system. Consequently, flow through the system is not appreciably impeded and thermal transfer through heat exchange surfaces is not impaired.

The effect of rate control upon the time and site at which precipitation occurs is also significant. For example, in complex paper mill systems, an adsorbent may effectively control scale formation in a particular digestor. However, precipitation may occur so rapidly, and without completely effective adsorption, with the result that precipitation instead occurs in the next phase of the system and the scale experienced in that phase is consequently increased, or unaffected by the use of the adsorbent. Rate control may be employed in such environments to reduce the rate at which precipitation occurs to the extent that the precipitate is not deposited until after the treated liquid has emerged from the system. At the same ime, the improvement of the efficiency of the adsorption function insures that any deposits realized will be susceptible to removal, regardless of whether precipitation and deposition occur within or outside of the system.

Similarly, in a once-through or non-recirculating cooling system, the timing and site of deposition are often critical. Conventional treatment with an adsorbent may not provide adequate time in which to achieve the adsorption function with the result that only a partially adsorbed precipitate is realized. The deposits will then adhere to the surfaces of the system and undergo crystalline growth. When rate control is imposed, a more effective adsorption is achieved, and any deposits precipitated within the system are resistant both to adhesion to the surfaces of the system and to crystalline growth. In addition, the reduction of the rate of precipitation which results from rate control may be designed to insure that deposition does not occur until after the treated water has left the system.

This highly desirable effect is achieved by superimposing an adsorbent and an acid having prescribed dissociation characteristics upon a system which contains constituents capable of forming undesirable precipitates. More precisely, the system is treated with the adsorbent and an acid having a dissociation constant or pKa (negative log of the dissociation constant) of between 3–8. It has been found, as will be subsequently discussed and shown, that the utilization of the described system drastically curtails the scale forming propensity of the impurities contained by the system and permits their conversion to a form in which they are readily removed from the system by means of normal flow. In addition, previously formed deposits are frequently removed by the treatment. The increased effectiveness which is realized in the practice of the invention is the direct and demonstrable result of the reduction in the rate of the particle growth and the precipitation rate which is caused by the use and presence of the acid. Because of this precipitation rate reduction, in combination with the attendantly increased surface area of the precipitating particles, maximal adsorption is realized with extensive and highly desirable changes in the nature of the precipitated sludge. Specifically, the affinity of the precipitated particles for the surfaces of the system and their ability to form a crystalline scale is greatly reduced, while their flocculant nature renders them ideally suitable for removal during normal flow.

The rate controlling agent has been described as an acid having a dissociation constant or pKa of between 3 and 8. While triglycollamic acid is preferred as the rate controlling agent, any other acid having a dissociation constant within the prescribed limits is also satisfactory. The selection of the rate controlling agent may be made by reference to a table of acid dissociation constants, such as that provided by many chemical handbooks, e.g., pages 1198–1202, Lange's "Handbook of Chemistry," 10th Edition, 1961, McGraw-Hill Book Co., New York, N.Y. Examples of other highly satisfactory rate controlling agents are ethylene diamine tetra acetic acid, oxalic acid, hydrosulfuric acid, meta and para toluic acid, citric acid, and the like. It should also be noted that acids having a plurality of dissociation constants which fall both within and without the prescribed range, are also satisfactory in the practice of the invention. Typical of the latter type of acid is the preferred rate controlling agent, triglycollamic acid, which has dissociation constants of 3.03, 3.07 and 10.70 ((Schwarzenbach, G.; Kampitsch, E.; and Steiner, R., "Complexons I. Salt Formation of Nitrilotriacetic Acid," Helv Chim. Acta: 828–40 (1945)). The operability of the rate controlling agents will be rendered apparent by subsequent discussion and demonstrated by data. However, it should presently be stated that an acid or rate controlling agent having a dissociation constant of between 3 to 8 is capable of exerting the effect desired in the practice of the invention. Naturally, such factors as cost, availability and undesirable side effects may render some acids more or less suitable, but do not limit their operability in the practice of the invention. The utilization of such critera in the selection of the rate controlling agent is well within the ken of those skilled in the art of boiler treatment. It should be noted that the selection of the prescribed dissociation constant range is not an arbitrary one but is instead based upon experimentation and discovery conducted and evolved in the development of the present invention. Specifically, the rate controlling agent must not compete to any substantial degree with the precipitating agent to the detriment of the formation of the desired precipitate. As has been determined, and as is substantiated hereafter, acids having a dissociation constant of between 3 to 8 will effectively control the precipitation rate of the salts which are formed without interfering with the actual formation of these salts, e.g., by competitive reactions, inter-reactions or complexing effects. The inhibiting or controlling effect of the inventive rate controlling agents is rendered apparent when one considers the environment of use employed by the invention. Specifically, both the precipitate forming impurities and the rate controlling agent are capable of a reaction or complexing effect and in the absence of either compound the reaction of the other compound would proceed. However, when both the precipitating agent and the rate controlling agent are simultaneously present in the system, the reaction between the impurities, which constitute weak acid anions, is rendered preferential. At the same time, the very presence of the rate controlling agent which unsuccessfully competes in the bid for reaction with the impurities, serves to reduce the rate with which the inter-reaction between the impurities would proceed were it not for the inhibiting presence of the rate controlling agent. The dissociation constant of the acid determines its potential reactivity with the impurities, and similarly determines the competitive or inhibiting effect of the acid upon the inter-reaction growth and precipitation of the impurities and the precipitate formed therefrom. Stated somewhat differently, the acid is selected for its potential reactivity with the impurities and the inhibiting effect which results from the competitive effect created by this potential reactivity. Since the dissociation constant is an indicator of the potential reactivity of the acid, and accordingly of the competitive effect, it may be employed as the means of selecting a suitable acid as the rate controlling agent.

The absorbents employed may be selected from a broad array of diverse materials. The fundamental criterion for the selection of the adsorbent is the ability of the adsorbent selected to adsorb with the particles of the precipitate which is formed. While partially desulfonated lignosulfonates are preferred, the adsorbents may comprise tannins, starches, other lignins, seaweed derivatives such as sodium mannuronate, sodium alginate or agar-agar, or polymeric adsorbents or polyelectrolytes which may be represented by those polymers, or the water soluble salts theeof, which contain the group

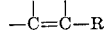

in which R is nitrile, amide, carboxyl or carboxyl alkyl. Typical of such polymers are the polyacrylamides, polyacrylates, sodium polyacrylate and the various copolymers thereof. Polymers of these types which have a molecular weight of between 5,000 to 20,000,000 are generally suitable. Such polymers are disclosed by U.S. Pat. 3,085,916.

While the most convincing evidence of the efficacy of the present invention is the fact that systems treated in accordance therewith are substantially clean, i.e., sludge and scale free, convincing data in support of both the efficacy of the invention and the mechanism by which it is believed that these results are achieved has been accrued in the course of this development. Included in this data are demonstrations that: the impurities contained by the treated systems inter-react to yield the expected precipitate rather than complexing or reacting with the acid rate controller; the acid rate controller reduces the particle size of the precipitates which are formed and consequently influences both the rate of precipitation and the degree of adsorption with the adsorbents; and, the extent of adsorption is increased by means of the rate controlling agent.

Since many of the rate controlling agents employed in the practice of the invention might be expected to react or complex with the impurities, a test designed to explore this possibility was conducted.

In the test series, calcium impurities typical of those which occur in water and which precipitate upon reaction with materials such as silt, oxalic acid, phosphate, etc., were combined with a precipitating agent, i.e., sodium phosphate; a rate controlling agent, i.e., triglycollamic acid; and silica; and studied to determine the inter-reaction which actually occurs between the impurities as opposed to any reaction of the impurities with the rate controlling agents. In the execution of the study the ingredients were added to distilled water, boiled for one hour at one atmosphere, and filtered through a series of membrane filters. The filtrates were subjected to testing for phosphate, magnesium and silica while the filters underwent X-ray analysis to yield the findings set forth by Table 1:

TABLE 1

| No. | Sample | Quantity of Potential Reactants in the Sample (mols/liter×10⁻³) | Quantity Remaining in the Filtrate (mols/liter×10⁻³) | Filter Deposits |
|---|---|---|---|---|
| 1 | Calcium impurities | 9.0 | 2.0 | Ca/PO₄ |
|  | Phosphate | 9.0 | 4.0 |  |
|  | Triglycollamic acid | 9.0 | 7.8 |  |
| 2 | Magnesium impurities | 9.0 | 1.38 | Mg/SiO₂ |
|  | Silica | 9.0 | 0.5 |  |
|  | Triglycollamic acid | 9.0 | 8.2 |  |

As may be observed, X-ray analysis of the filter deposits indicates that the impurities inter-reacted to form calcium phosphate and magnesium silicate as opposed to reacting with the rate control agent. At the same time, the reduced quantities of calcium, magnesium, phosphate and silica in the filtrate, and the substantially undiminished quantities of the rate controlling agent, indicate that the formation of the desired precipitate with the precipitating anion is preferential and any reaction or complexing of the impurities with the rate controlling agent is negligible if extant. In all cases, precipitation occurred and the X-ray analysis revealed the presence of the metal ion and the precipitating ion in the precipitate. Comparable results were also realized when ethylene diamine tetra acetic acid was substituted for the triglycollamic acid.

For the purpose of further investigating the inter-reactions of the precipitating agents, rate controlling agents, and calcium impurities, appropriate samples were studied by the potentiometric methods of Schwarzenbach and Bjerrum ("Metal Amine Formation in Aqueous Solution," Haase, Copenhagen, 1941). Samples containing triglycollamic acid and calcium impurities were studied in both the presence and absence of sodium phosphate. Similarly, ethylene diamine tetra acetic acid and calcium impurities were studied in the presence and absence of sodium phosphate. In both cases the presence of the phosphate yielded potentiometric curves which indicated the formation of a salt in a competitive system of two reacting anions. When considered with the results of Table 1, it is apparent that calcium phosphate is formed in the presence of the second anion, i.e., the rate controlling agent, which competes for, but does not achieve, reaction with the calcium impurities.

All of the above showings have been designed to demonstrate that when calcium impurities are exposed to the combination of a weak acid anion impurity and an acid having a dissociation constant of between 3 to 8, reaction with the weak anion impurity is preferential despite the fact that both compounds are potentially reactive with the calcium impurities. Such demonstrations have been made with a number of acids having the prescribed dissociation characteristics. To a limited extent, these showings have also indicated that the presence of the rate controlling agent exerts a competitive effect which could be expected to curtail the reaction rate of the calcium impurities and the weak anion impurity, i.e., the potentiometric studies.

However, the effect of the rate controlling agent in reducing the rate of formation, growth and precipitation of impurities, with a consequent reduction in the size of the precipitate particles and an increase in the surface area of these particles, is best demonstrated by other means.

To this end, samples containing the same quantity of calcium and phosphate, but progressively increased quantities of the rate controlling agent, were prepared and tested. These samples all comprised $9.0 \times 10^{-3}$ mols of calcium and $5.4 \times 10^{-3}$ mols of phosphate in distilled water, but the quantity of the rate controlling agent (mol percentage of rate controlling agent:calcium) was gradually increased from 0 to 75%. Each sample was boiled for one half hour, filtered through a 0.8 micron membrane filter, and the percentage of calcium phosphate particles which passed through the filter was determined, as shown by Table 2:

TABLE 2

| Sample No.: | Mol Percent of Triglycollamic Acid:Calcium Contained by Sample | Percentage of Calcium Phosphate Particles Which Passed Through a 0.8 Micron Filter |
|---|---|---|
| 1 | 0 | 2 |
| 2 | 5 | 35 |
| 3 | 75 | 42 |

As may be observed, the addition of the rate controlling agent drastically reduced the size of the calcium phosphate particles and the size reduction realized was further increased as the quantity of acid was increased. While this data does not directly demonstrate a reduction in the precipitation rate, it does clearly reveal a reduction in the size of the particles of precipitate and such a reduction is always accompanied by a decrease in the precipitation rate. This same approach was employed to determine the effect of various ratios of the rate controlling agent. Specifically, it was found that when the mol ratio of rate controlling agent:calcium ions was increased above 1:1, the decrease in particle size was not appreciably increased. Specifically, the benefit realized by employing a mol ratio of 2:1 as opposed to 1:1 was almost nonexistent. Since the rate controlling agent represents an appreciable portion of the treatment cost of the inventive methods, the benefit realized when the ratio is increased above 1:1 is disproportionate to the increased cost. Consequently, rate controlling agent:calcium ratios of less than 1:1, and preferably 0.25–0.5:- are preferred.

A study such as that discussed above in respect to Table 2, was also conducted with oxalic acid. The results of that study are set forth in Table 2A below:

TABLE 2A

| Sample No.: | Mol Percent of Oxalic Acid:Calcium Contained by Sample | Percentage of Calcium Phosphate Particles Which Passed Through a 1.2 Micron Filter |
|---|---|---|
| 1a | 0 | 29 |
| 1b | 25 | 60 |
| 1c | 95 | 80 |

It must again be noted that the addition of oxalic acid as a rate controlling agent greatly reduced the size of the calcium phosphate particles and further particle size reduction was realized as the quantity of rate controlling agent was increased. Obviously, the rate controlling agent has controlled and reduced the rate of particle growth, with a consequent reduction of the precipitation rate, and if an adsorbent was present in such a system, it would be provided with a longer time in which to adsorb with the particles prior to their precipitation, and with the greater surface area for adsorption which is presented by smaller particles.

The foregoing tests have demonstrated that the calcium impurities react preferentially with the other weak anion impurities, but that the rate controlling agent functions to reduce the rate of growth of the particles of precipitate formed by that reaction, with a consequent reduction in the rate of precipitation and an increase in the available surface area of the particles of precipitate present within the system. However, mere control of the precipitation rate will not serve to prevent the formation of scale. Irrespective of the precipitation rate, if the particles are in fact precipitated they will deposit on the surfaces of the treated system and undergo crystalline growth to form scale. Accordingly, the inventive improvement must be combined with the use of adsorbents which are conventionally employed in such systems. In essence, the inventive technique renders the adsorption of the precipitate more effective, to yield a manageable deposit which is readily removed by flow through the system before scale formation can occur. This improved efficiency is the direct result of both the slower precipitation rate which exposes the particles of precipitate to the adsorbent for a greater period, and the fact that the reduced size of the particles resulting from the retarded growth rate, presents an increased surface area for adsorption.

In order to determine that such improved adsorption is in fact achieved, another test series was conducted. In these tests, samples containing an adsorbing agent and gradually increased quantities of the rate controlling agent were prepared and their absorbance was determined spectrophotometrically. Each sample consisted of distilled water containing $5.4 \times 10^{-3}$ mols of phosphate, $9.0 \times 10^{-3}$ mols of calcium impurities, and 40 parts per million by weight of an adsorbent, with the quantity of the rate controlling agent increased from 0 to 50 mol percent among the different samples. The adsorbent employed in these tests was partially desulfonated sodium lignosulfonate. Each sample was boiled for ½ hour, filtered through a 0.05 micron filter, and adsorbance values of the precipitate were determined as shown by Table 3:

TABLE 3

| Sample No.: | Quantity of Triglycollamic Acid Contained by the Sample (Mol percent) | Adsorbance value ($\Delta A$) |
|---|---|---|
| 1 | 0 | 0.245 |
| 2 | 10 | 0.290 |
| 3 | 50 | 0.380 |

As is apparent, the absorbance of these samples was increased as the quantity of rate controlling agent was increased. Absorbance was increased by 18% with 10 mol percent of the rate controlling agent, and by 55% when the quantity of rate controlling agent was 50 mol percent.

To further demonstrate the rate control function, an additional test was conducted. Specifically, an admixture of distilled water containing $5.4 \times 10^{-3}$ mols of phosphate and $9.0 \times 10^{-3}$ mols of calcium impurities was prepared. The admixture was then divided into 3 equal portions and one portion of this admixture was retained as a control while an adsorbent, and the combination of a rate controlling agent and adsorbent, were added to the two remaining portions of the mixture. The rate controlling agent and adsorbent were those employed in the tests described in conjunction with Table 3. All three samples were boiled for ½ hour, and then filtered through a 0.45 micron filter. The percentages of the calcium phosphate particles in each sample which were trapped by the filter were then determined as shown by Table 4:

TABLE 4

| Additives | Percent of Calcium Phosphate Particles Which Passed Through Filter |
|---|---|
| Sample No.: | |
| 1 — None | 2 |
| 2 — Adsorbent (200 mgs.) | 24 |
| 3 — Adsorbent plus rate controlling agent. | 53 |

It should be noted that in the absence of a rate controlling agent or adsorbent (Sample 1) the calcium phosphate particles were large, and consequently characterized by a high precipitation rate and a low adsorption potential due to the reduced time during which adsorption could occur, and the reduced surface area available for adsorption.

When the same system was prepared in the presence of an adsorbent (Sample 2), the resulting adsorption curtailed particle growth to yield more calcium phosphate particles of a smaller size.

These results may be readily interpreted in light of the previously discussed studies. When neither a rate controlling agent nor an adsorbent were employed (Sample 1) the calcium and phosphate rapidly reacted to form calcium phosphate particles which grew and precipitated rapidly. As a consequence, 98% of the particles were unable to pass through the filter. When an adsorbent was added to the system (Sample 2) the physical barrier provided by the adsorption of the adsorbent upon the surface of the calcium phosphate particles inhibited particle growth to provide a greater number of small particles. When both an adsorbent and rate controlling agent were utilized (Sample 3), the latter inhibited the reaction of the calcium and phosphate and the rate of growth and precipitation of the resultant particles, while the former provided the growth inhibiting effect described in respect to Sample 2. As a consequence, any calcium phosphate precipitated from the system would be optimally adsorbed with the adsorbent to provide a precipitate having a reduced tendency toward crystalline growth, e.g. to form scale, and readily susceptible to removal by normal flow through the system.

While the foregoing aptly demonstrates the theoretical efficacy of rate control, its practical application is best illustrated by the utilization set forth by Examples 1 and 2.

EXAMPLE 1

A steel mill employing 50,000 gallons per minute of river water as a once-through non-recirculating, cooling medium experienced frequent shutdowns as the result of silt entrained in the river water which deposited within the cooling system. Analysis revealed a kaolinitic silt was depositing both as the product of the silt reacted with the calcium hardness of the water, and as the silt per se. Sodium lignosulfonate was employed as an adsorbent at a level of 8 to 12 parts per million but some deposits were still realized. The treatment of the water was modified to employ 6 parts per million of sodium lignosulfonate and 2 parts per million of triglycollamic acid. During a 30-day treatment period, no further perceptible deposits were experienced.

EXAMPLE 2

A steel mill employed 100,000 gallons per minute of river water as a once-through or non-recirculating cooling medium. The presence of a bentonitic silt resulted in deposits which required frequent shutdowns for mechanical and chemical cleaning. Analysis of the deposits indicated that the deposits were comprised of both the silt and the reaction or coordination products of the silt and the calcium hardness constituents of the water. The mill had employed a polyacrylamide polymer having a molecular weight of approximately five million for the purpose of controlling the deposits. The polyacrylamide was fed to the intake water at a level of one part per million for 30 minutes during each 24 hour period. Such periodic feeding was employed because of the relatively high cost of the polyacrylamide which economically prohibited its continuous use at effective levels. In addition, it was believed that the polyacrylamide functioned to remove any deposits which were formed during the period between applications of the polyacrylamide. Despite this treatment, some deposits persisted and necessitated shutdowns for the purpose of cleaning. The treatment was modified by employing 0.5 p.p.m. of polyacrylamide and 0.5 p.p.m. of triglycollamic acid for a 30-minute period during each 24 hours. During a 90-day treatment period the deposits formerly noticed when the polyacrylamide was employed alone were no longer experienced.

It has also been found that the superimposition of additional treating materials such as zinc appear to further enhance the efficiency of the inventive methods and materials. Specifically, water soluble compounds of iron, zinc, nickel, cobalt, cadmium, copper and aluminum, such as zinc chloride and ferrous nitrate, yield metal ions which appear to extend the adsorption range of the adsorbent which is employed. It is believed that these metal ions exchange with cations in the surface of contaminants such as silt, and particularly bentonitic sils, to render the contaminants susceptible to the adsorption range of the adsorbent which is employed. Such treatment is described in further detail in the applicant's copending application Ser. No. 647,931 which was filed on June 22, 1967.

The foregoing metal ion treatment has demonstrated its efficacy in combination with the present invention. It is believed that the metal ions merely serve to extend the adsorption range of the adsorbent employed without interfering with the rate controlling effect which results from the competition between the rate controlling agent and the precipitants for formation of the precipitate. A demonstration of the combination of the rate controlling effect and the metal ion absorption range extension effect is provided in Example 3.

EXAMPLE 3

The treatment described by Example 2 was modified to comprise 0.25 p.p.m. of polyacrylamide, 0.25 p.p.m. of triglycollamic acid and 1 p.p.m. of zinc chloride. The treating materials were fed during a 30-minute period each day and at the end of 30 days, no troublesome deposits had been detected. It should be noted that the metal ion topping treatment yields appreciable economies in that the cost of materials such as zinc chloride is significantly less than the cost of either polyacrylamide or triglycollamic acid.

As previously mentioned, the present invention has demonstrated extensive utility in paper mill applications. One such application is set forth by Example 4. This example also illustrates the efficacy of the invention in controlling the site at which deposition occurs within a particular system.

EXAMPLE 4

A paper mill experienced extensive scale formation problems in a Kamyr Continuous Digertor for sulfate pulp. Scale was experienced both upon the stainless steel screen of the chip chute and in the heat exchangers used to heat the cooking liquor. In the case of the chip chute screens, the entire operation was shut down for 8 hours every 4 to 5 weeks for the purpose of cleaning. In the case of the heat exchangers, an alternate or standby heater was employed in order to avoid the necessity for cleaning shutdowns, with a resultant increase in the expense of the process equipment. Analysis of the scale deposits revealed that calcium oxalate and calcium carbonate were the cause of scale formation. Treatment of the system was undertaken with 0.125 pound of polyacrylic acid (molecular weight 80,000) being continuously added for each ton of pulp processed by the system. The chemical was added to the white liquor at a point six feet upstream of the chip chute. The white liquor was fed to the chip chute at a rate of 280 gallons per minute and a temperature of 250° F. Analysis of the white liquor stream revealed between 500–600 p.p.m. of calcium, while the cooking liquor in the digestor contained between 1500–2000 p.p.m. of calcium due to concentration. At the end of 6 days of the foregoing treatment, it was found that scale formation on the chip chute screen was eliminated but that the scale problem in the heat exchanger area was substantially unchanged. It was believed that the lack of success in the latter area resulted from the fact that the polyacrylate adsorbent functioned well at the point of addition, i.e. the chip chute, but that the adsorbent function was expended by the time that the treated stream reached the heat exchanger-cooker zone. In addition, the previously referred to concentration in the cooker area yielded conditions which highly favored the formation of scale. On this basis, it was felt that this application could benefit from the use of rate control. Accordingly, the treatment was modified to employ 0.1 pound of polyacrylic acid in combination with 0.025 pound of equal parts triglycollamic acid and monosodium phosphate for each ton of pulp processed by the system. At the end of one week, examination revealed that scale formation had been eliminated in both the chip chute and the heat exchange zones.

The treatment levels to be employed in the practice of the present invention are not subject to generalization and must be based upon the precise nature and extent of the impurities to be dealt with. In ascertaining the quantity of rate control agent to be employed, the amounts of the reactants capable of forming the precipitate should first be established. The rate control agent may then be utilized in a ratio of between 0.05–1 mol for each mol of the potential scale forming reactant which is present in the least quantity. For example, if the system to be treated contained calcium compounds and phosphate in a 1:10 ratio, between 0.05–1 mol of a rate controlling agent such as triglycollamic acid should be employed for each mol of the calcium compound. There is no necessity for employing rate control in relation to the excess phosphate, i.e. 9 mols, since the system contains no reactants with which the excess phosphate can react to form a precipitate. The same approach is followed when the mechanism to be dealt with is association or coordination as opposed to chemical reaction. Specifically, the rate control agent should be utilized in a 0.5–1:1 molar ratio with the participant in the association, coordination or complexing phenomenon which is present in the least quantity.

In the case of the adsorbent, chemical ratios do not apply since adsorption is a physical phenomenon. Accordingly, the particular adsorbent employed must be appraised in terms of its specific adsorption potential in relation to the precipitate which is to be adsorbed. Simple jar tests or adsorbance studies such as those shown by Table 3, may be conducted for this purpose. However, in most cases, the adsorbent may be employed in a quantity of between 0.1 to 10 parts by weight for each part by weight of the precipitate which is to be adsorbed.

Similarly, in those inventive embodiments which utilize both the rate control effect and the extension of the adsorption potential of the precipitate by means of a metal ion, the metal ion donor is employed in quantities which are based upon physical rather than chemical considerations. Again, actual testing of the adsorption efficiency improvement yielded by various quantities of a particular metal such as zinc should be conducted in conjunction with the actual precipitate to be treated and the specific adsorbent which is to be employed.

While the specification has dealt predominantly with cooling water and paper mill applications, it must be realized that the inventive mechanism of rate control can be successfully applied to any system in which an undesirable precipitate is formed and in which the precipitate is susceptible to control by adsorbents. In all such environments, rate control may be utilized to greatly enhance the efficiency of the adsorption phenomenon.

We claim:
1. A method for controlling the deposition of precipitate particles which are formed by the reaction or association of constiuents contained in an aqueous system which constituents are selected from the group consisting of calcium compounds, magnesium compounds, oxalic acid, oxalates, water-soluble phosphates, silts, manganese impurities, iron impurities, cobalt impurities, carbonate impurities, sulfate impurities, and mixtures thereof, which comprises adding to said system an acid having a dissociation constant of between 3 and 8 which is capable of controlling and in an amount sufficient to control the reaction or association of said constituents to thereby permit the formation of precipitate particles which can be effectively adsorbed by an adsorbent, and an adsorbent which is capable of adsorbing and in an amount sufficient to effectively adsorb precipitate particles formed by the reaction or association of the said constituents, wherein said acid is added in an amount of from about 0.05 to 1 mole for each mole of the constituent which is present in least quantity and wherein said adsorbent is added in a quantity of between 0.1 to 10 parts by weight for each part by weight of the precipitate to be adsorbed.

2. A method according to claim 1 wherein said acid is triglycollamic acid.

3. A method according to claim 1 wherein said acid is ethylenediaminetetraacetic acid.

4. A method according to claim 1 wherein said adsorbent is selected from the group consisting of lignosulfonate, lignin, tannin, starch, mannuronate salts, alginate salts, agar, polymeric compounds having a molecular weight of between 5,000 to 20,000,000 and containing the group

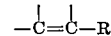

wherein R is selected from the group consisting of nitrile, amide, carboxyl and carboxyl-alkyl, and the water soluble salt of said compounds.

5. A method for controlling the deposition of precipitate particles which are formed by the reaction or association of constituents contained in a cooling water system, which constituents are selected from the group consisting of calcium compounds, magnesium compounds, oxalic acid, oxalates, water-soluble phosphates, silts, manganese impurities, iron impurities, cobalt impurities, carbonate impurities, sulfate impurities and mixtures thereof, which comprises adding to said system an acid having a dissociation constant of between 3 and 8 which is capable of controlling and in an amount sufficient to control the reaction or association of said constituents to the extent that precipitate particles are formed which can be effectively adsorbed by an adsorbent, and an adsorbent which is capable of adsorbing and in amount sufficient to effectively adsorb the precipitate particles formed by the reaction or association of the constituents contained in said system, wherein said acid is added in amount of from 0.05 to 1 mole for each mole of constituent which is present in least quantity, and wherein said adsorbent is added in a quantity of between 0.1 to 10 parts by weight for each part by weight of the precipitate to be adsorbed.

6. A method according to claim 5 wherein said adsorbent is selected from the class consisting of lignosulfonate, lignin, tannin, starch, mannuronate salts, alginate salts, agar, polymeric compounds having a molecular weight of between 5,000 to 20,000,000 and containing the group

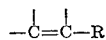

wherein R is selected from the group consisting of nitrile, amide, carboxyl and carboxyl-alkyl, and the water soluble salt of said compounds.

7. A method for controlling the deposition of precipitate particles which are formed by the reaction or association of constituents contained in the aqueous systems of a pulp or paper mill which constituents are selected from the group consisting of calcium compounds, magnesium compounds, oxalic acid, oxalates, water-soluble phosphates, silts, manganese impurities, iron impurities, cobalt impurities, carbonate impurities, sulfate impurities and mixtures thereof, which comprises adding to said system an acid having an dissociation constant of between 3 to 8 which is capable of controlling and in an amount sufficient to control the reaction or association of said constituents to the extent that precipitate particles which are formed by the reaction or association of the constituents in the system can be effectively adsorbed by an adsorbent, and an adsorbent which is capable of adsorbing and in an amount sufficient to adsorb the precipitate particles formed by the reaction or association of said constituents, wherein said acid is added in amount of from about 0.05 to 1 mole for each mole of the constituent which is present in least quantity, and wherein said adsorbent is added in a quantity of between 0.1 to 10 parts by weight for each part by weight of the precipitate to be adsorbed.

8. A method according to claim 7 wherein the adsorbent is selected from the class consisting of lignosulfonate, lignin, tannin, starch, mannuronate salts, alginate salts, agar, polymeric compounds having a molecular weight of between 5,000 to 20,000,000 and containing the group

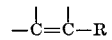

wherein R is selected from the group consisting of nitrile, amide, carboxyl and carboxyl-alkyl, and the water soluble salt of said compounds.

References Cited
UNITED STATES PATENTS 3,085,975   4/1963   Jennings _____ 252—181 X
3,296,027   1/1967   Jacklin _____ 252—180 X MAYER WEINBLATT, Primary Examiner I. GLUCK, Assistant Examiner U.S. Cl. X.R.

21—2.7; 134—3, 41; 210—57, 58; 252—85, 389